US008035603B2

(12) United States Patent

Furukawa et al.

(10) Patent No.: US 8,035,603 B2
(45) Date of Patent: Oct. 11, 2011

(54) ILLUMINATION SYSTEM AND LIQUID CRYSTAL DISPLAY

(75) Inventors: Norimasa Furukawa, Tokyo (JP); Mitsuru Okabe, Tokyo (JP); Mitsunari Hoshi, Miyagi (JP)

(73) Assignee: Sony Corporation (JP)

( * ) Notice: Subject to any disclaimer, the term of this patent is extended or adjusted under 35 U.S.C. 154(b) by 788 days.

(21) Appl. No.: 11/805,851

(22) Filed: May 24, 2007

(65) Prior Publication Data

US 2007/0291197 A1 Dec. 20, 2007

(30) Foreign Application Priority Data

May 30, 2006 (JP) ................................ P2006-149265

(51) Int. Cl.
*G09G 3/36* (2006.01)
*G02B 3/00* (2006.01)

(52) U.S. Cl. ........................... 345/102; 345/98; 359/649

(58) Field of Classification Search ............ 345/30–109; 349/68

See application file for complete search history.

(56) References Cited

U.S. PATENT DOCUMENTS 6,069,676 A 5/2000 Yuyama
2003/0117714 A1* 6/2003 Nakamura et al. ............ 359/649
2003/0230991 A1 12/2003 Muthu et al.
2005/0035939 A1 2/2005 Akiyama
2005/0117190 A1 6/2005 Iwauchi et al.
2005/0179633 A1* 8/2005 Inada ............................. 345/98
2006/0152468 A1* 7/2006 Ozaki ........................... 345/102

FOREIGN PATENT DOCUMENTS

EP 1 562 170 8/2005
JP 5-127602 A 5/1993
JP 11-295689 A 10/1999
JP 2001-272938 A 10/2001
JP 2005-091526 A 4/2005
JP 2005-093566 A 4/2005
JP 2005-208486 A 8/2005
JP 2005-302737 A 10/2005
JP 2005-310996 A 11/2005
JP 2006-031977 A 2/2006
JP 2006-114324 A 4/2006
WO 2005/050613 A 6/2005

* cited by examiner

*Primary Examiner* — Alexander S Beck
*Assistant Examiner* — Charles Hicks
(74) *Attorney, Agent, or Firm* — Lerner, David, Littenberg, Krumholz & Mentlik, LLP

(57) ABSTRACT

An illumination system capable of varying the light emission intensity of illumination light while maintaining the color balance of the illumination light is provided. An additive process illumination system obtaining a specific color light by mixing a plurality of color lights, the illumination system may include a plurality of light sources each emitting a different color light; a lighting period varying means for varying the lighting period of each light source; a light emission intensity varying means for varying the light emission intensity of each light source; and a control means for controlling the lighting period varying means and the light emission intensity varying means to control the light emission amount of each light source.

14 Claims, 19 Drawing Sheets

ILLUMINATION SYSTEM AND LIQUID CRYSTAL DISPLAY

CROSS-REFERENCE TO RELATED APPLICATIONS

This application claims priority from Japanese Patent Application No. JP 2006-149265 filed in the Japanese Patent Office on May 30, 2006, the entire content of which is incorporated herein by reference.

BACKGROUND OF THE INVENTION

1. Field of the Invention

The present invention relates to an additive process illumination system obtaining a specific color light by mixing a plurality of color lights, and a liquid crystal display using such an illumination system.

2. Description of the Related Art

In recent years, flat panel displays as typified by liquid crystal TVs and plasma display panels (PDPs) have become a trend, and among them, most of mobile displays are liquid crystal displays, and precise color reproducibility is desired in the mobile displays. Moreover, as backlights for liquid crystal panels, CCFLs (Cold Cathode Fluorescent Lamps) using fluorescent tubes are mainstream; however, mercury-free light sources are environmentally desired, so light emitting diodes (LEDs) and the like hold promise as light sources replacing CCFLs.

Further, illumination systems using LEDs and the like have become commercially practical recently.

In such illumination systems using LEDs in related arts, the drive currents of the LEDs are controlled by pulse width modulation (PWM) to adjust their light emission intensities (for example, refer to Japanese Unexamined Patent Application Publication No. 2005-310996).

FIG. 20 shows the circuitry of an illumination system using LEDs controlled by PWM in a related art. An illumination system 101 includes a main power source 110, constant current power sources 110R, 110G and 110B, a light source section 111 including a red LED 111R, a green LED 111G and a blue LED 111B each of which includes a plurality of serially connected LEDs, PWM drivers 113R, 113G and 113B, switches 114R, 114G and 114B, a light receiving section 115 including a red light receiving section 115R, a green light receiving section 115G and a blue light receiving section 115B, a light receiving signal processing section 116, an A/D conversion circuit 117 and a CPU (Central Processing Unit) 118. In the illumination system 101, by power supplied from the main power source 110, constant currents I101, I102 and I103 flow from the constant current power sources 110R, 110G and 110B to the red LED 111R, the green LED 111G and the blue LED 111B, respectively, and a red light, a green light and a blue light are emitted. Moreover, such color lights are received in the light receiving section 115, and the light receiving signal processing section 116 and the A/D conversion circuit 117 perform a predetermined signal process on light receiving signals of the color lights, and on the basis of the light receiving signals, control signals are supplied from the CPU 118 to the PWM drivers 113R, 113G and 113B. Then, the on/off states of the switches 114R, 114G and 114B are controlled by the PWM drivers 113R, 113G and 113B, respectively, so the lighting periods of the red LED 111R, the green LED 111G and the blue LED 111B are individually controlled.

SUMMARY OF THE INVENTION

However, in such PWM control, a light emission intensity is controlled only by the length (width) of the lighting period of each color LED, so in the case where the light emission intensity is adjusted by changing the width of the lighting period, the color balance of illumination light is lost (a chromaticity point is moved). In other words, for example, even in the case where a white light is desired, colored illumination light is emitted.

Thus, in a technique of controlling the light emission intensity only by the length (width) of the lighting period in a related art, it is difficult to vary the light emission intensity of the illumination light while maintaining the color balance of the illumination light, so there is room for improvement.

In view of the foregoing, it may be desirable to provide an illumination system capable of varying the light emission intensity of illumination light while maintaining the color balance of the illumination light, and a liquid crystal display including such an illumination system.

According to an embodiment of the invention, there is provided an additive process illumination system obtaining a specific color light by mixing a plurality of color lights, the illumination system may include a plurality of light sources each emitting a different color light; a lighting period varying means for varying the lighting period of each light source; a light emission intensity varying means for varying the light emission intensity of each light source; and a control means for controlling the lighting period varying means and the light emission intensity varying means to control the light emission amount of each light source.

According to an embodiment of the invention, there is provided a liquid crystal display which may include an additive process illumination means for emitting a specific color light produced by mixing a plurality of color lights; and a liquid crystal panel modulating light emitted from the illumination means on the basis of an image signal, wherein the illumination means may include a plurality of light sources each emitting a different color light; a lighting period varying means for varying the lighting period of each light source; a light emission intensity varying means for varying the light emission intensity of each light source; and a control means for controlling the lighting period varying means and the light emission intensity varying means to control the light emission amount of each light source.

In the illumination system and the liquid crystal display according to the embodiment of the invention, different color lights may be emitted from a plurality of light sources. The lighting period and the light emission intensity of each light source may be controlled so as to be varied, thereby the light emission amount of each light source may be controlled.

The illumination system according to the embodiment of the invention may further include a detection means for detecting the light emission amount of each light source, wherein the control means may control the lighting period varying means and the light emission intensity varying means on the basis of a detection result of the above-described detection means. In this case, the above-described detection means may include a plurality of first light receiving elements each extracting and receiving each color component from a mixed color light produced by mixing color lights from the plurality of light sources, a second light receiving element receiving the above-described mixed color light as it is, a first detection means for concurrently performing a sampling on a light receiving signal from the above-described first light receiving elements over or during a predetermined gate period, and detecting, on the basis of a result of the sampling, an intensity-dependent light emission amount which depends on a light emission intensity of the corresponding light source, and a second detection means for detecting, on the basis of a light receiving signal from the above-described second light receiving element, a period-dependent light emission amount which depends on lighting periods of the light sources. Moreover, the above-described detection means may include the above-described plurality of first light receiving element, the above-described first detection means, and a third detection means for detecting, on the basis of at least one of light receiving signals from the first light receiving elements, the above-described period-dependent light emission amount. In the latter case, the second light receiving element in the former case may not be necessary, so the structure is simpler than the former case.

The illumination system according to the embodiment of the invention can be used as a backlight for liquid crystal display, the backlight emitting light as the incident light from each light source to the liquid crystal panel, the light emission amount of each light source being controlled by the control means. In such a structure, in a display light emitted from the liquid crystal panel, while maintaining the color balance, the light emission intensity can be varied, so the quality of a displayed image may be improved.

In the illumination system or the liquid crystal display according to the embodiment of the invention, the lighting period and the light emission intensity of each light source may be varied to control the light emission amount of each light source, so while maintaining the color balance of the illumination light, the light emission intensity can be varied.

Other and further objects, features and advantages of the invention will appear more fully from the following description.

DETAILED DESCRIPTION

Preferred embodiments will be described in detail below referring to the accompanying drawings.

First Embodiment

<Structure of Illumination System>

Figure 1:
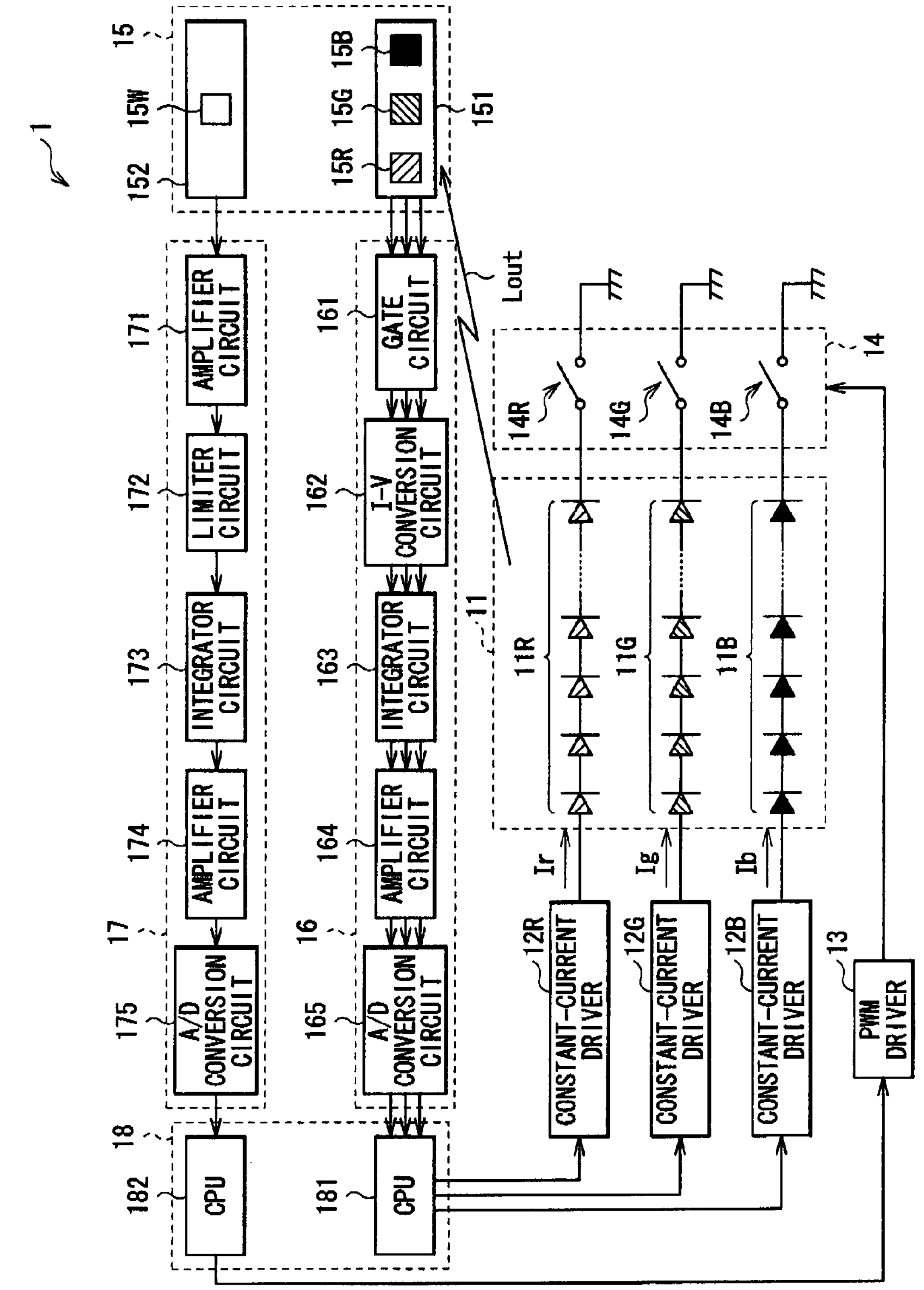
FIG. 1 is a circuit block diagram showing the whole structure of an illumination system according to a first embodiment of the invention.

FIG. 1 shows the whole structure of an illumination system (an illumination system 1) according to a first embodiment of the invention. The illumination system 1 is an additive process illumination system obtaining a specific color light (in this case, a white light) by mixing a plurality of color lights (in this case, a red light, a green light and a blue light), and includes a light source section 11, constant-current drivers 12R, 12G and 12B and a PWM driver 13, a switch section 14, a light receiving section 15, an intensity-dependent light emission amount detecting section 16, a period-dependent light emission amount detecting section 17 and a control section 18.

The light source section 11 includes a red LED 11R, a green LED 11G and a blue LED 11B each of which includes a plurality of serial-connected LEDs.

The constant-current drivers 12R, 12G and 12B are connected to the anodes of the red LED 11R, the green LED 11G and the blue LED 11B, respectively, and supply drive currents Ir, Ig and Ib as constant currents to the red LED 11R, the green LED 11G and the blue LED 11B, respectively, according to a control signal from a CPU 181 which will be described later. As will be described in detail later, the light emission intensities of these LEDs 11R, 11G and 11B can be individually adjusted according to the magnitudes of the drive currents Ir, Ig and Ib, respectively.

The switch section 14 includes switches 14R, 14G and 14B arranged between the cathode of the red LED 11R and the ground, between the cathode of the green LED 11G and the ground and between the cathode of the blue LED 11B and the ground, respectively. Moreover, the PWM driver 13 synchronously controls the lighting periods of the red LED 11R, the green LED 11G and the blue LED 11B by controlling the on/off states of the switches 14R, 14G and 14B according to a control signal from a CPU which will be described later.

The light receiving section 15 receives an illumination light Lout from the light source section 11, and includes a RGB photosensor 151 as a section extracting and receiving each color component (a red light, a green light and a blue light) from the illumination light Lout as a mixed color light, and a W photosensor 152 as a section receiving a white light as it is without separating the illumination light Lout into color components. The RGB photosensor 151 includes a red light receiving section 15R selectively extracting and receiving a red light from the illumination light Lout, a green light receiving section 15G selectively extracting and receiving a green light, and a blue light receiving section 15B selectively extracting and receiving a blue light. The W photosensor 152 includes a white light receiving section 15W receiving a white light as it is. In the light receiving section 15 with such a structure, while an each color light receiving signal received in the RGB photosensor 151 is outputted to a gate circuit 161 in the intensity-dependent light emission amount detecting section 16, a white light receiving signal received in the W photosensor 152 is outputted to an amplifier circuit 171 in the period-dependent light emission amount detecting section 17.

The intensity-dependent light emission amount detecting section 16 performs a predetermined signal process on each color light receiving signal from the RGB photosensor 151, and detects an intensity-dependent light emission amount which will be described later. The intensity-dependent light emission amount detecting section 16 includes a gate circuit 161 performing a sampling operation over or during a predetermined gate period, an I-V conversion circuit 162 performing I-V (current-voltage) conversion, an integrator circuit 163 determining an integral in the above-described gate period by calculation, an amplifier circuit 164 amplifying a signal intensity and an A/D conversion circuit 165 performing A/D (analog/digital) conversion.

The period-dependent light emission amount detecting section 17 performs a predetermined signal process on a mixed color light receiving signal from the W photosensor 152, and detects a period-dependent light emission amount which will be described later. The period-dependent light emission amount detecting section 17 includes an amplifier circuit 171 amplifying a signal intensity, a limiter circuit 172 performing a predetermined limiter process, an integrator circuit 173 determining an integral after the limiter process by calculation, an amplifier circuit 174 amplifying a signal corresponding to the integral, and an A/D conversion circuit 175 performing A/D conversion.

The control section 18 includes a CPU 181 and a CPU 182. The CPU 181 controls the constant-current drivers 12R, 12G and 12B on the basis of the intensity-dependent light emission amount supplied from the intensity-dependent light emission amount detecting section 16 so as to maintain the chromaticity point of the illumination light Lout without change (in this embodiment, as will be described later, so as not to change the chromaticity point from a white chromaticity point Pw on an xy chromaticity diagram), and adjusts the magnitudes of the drive currents Ir, Ig and Ib. The CPU 182 controls the PWM driver 13 on the basis of the period-dependent light emission amount supplied from the period-dependent light emission amount detecting section 17 so that the light emission intensity (a light emission amount B) of the illumination light Lout becomes a desired value, and adjusts the on states of the switches 14R, 14G and 14B, that is, the widths of the lighting periods ΔT of the red LED 11R, the green LED 11G and the blue LED 11B.

Figure 2:
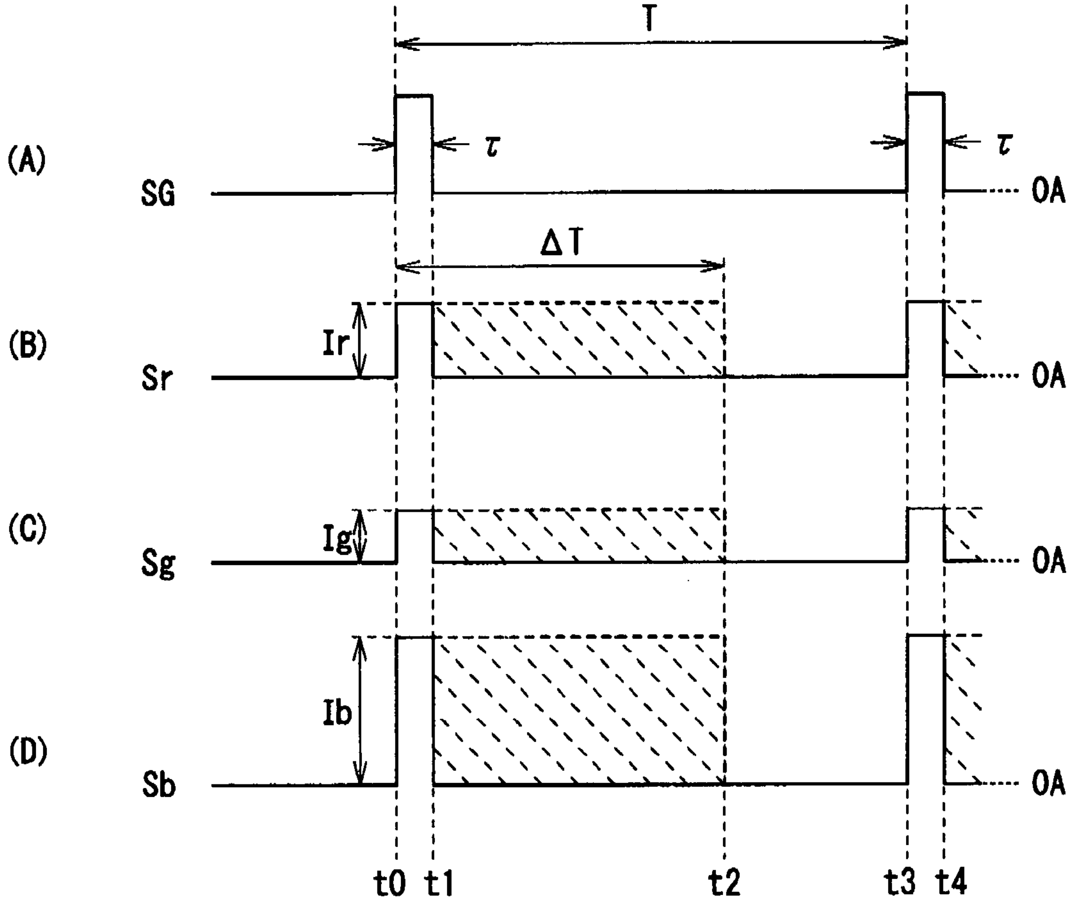
FIG. 2 is a timing chart for describing the operation of an intensity-dependent light emission amount detecting section.
Figure 3A:
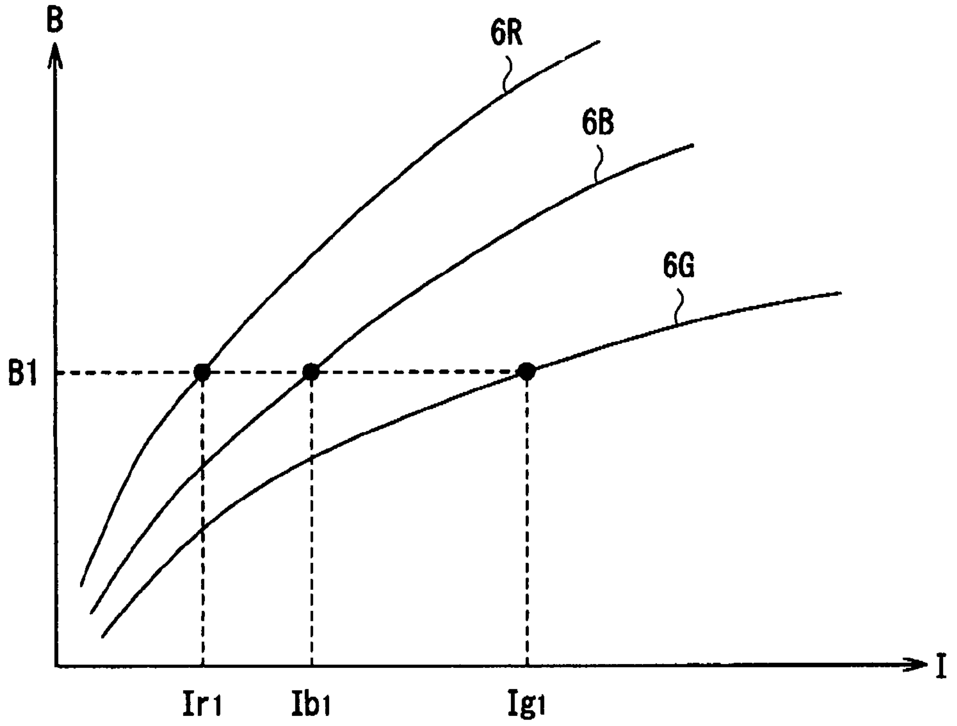
FIGS. 3A and 3B are plots for describing a process of controlling a light emission intensity by a control section according to the first embodiment.
Figure 3B:
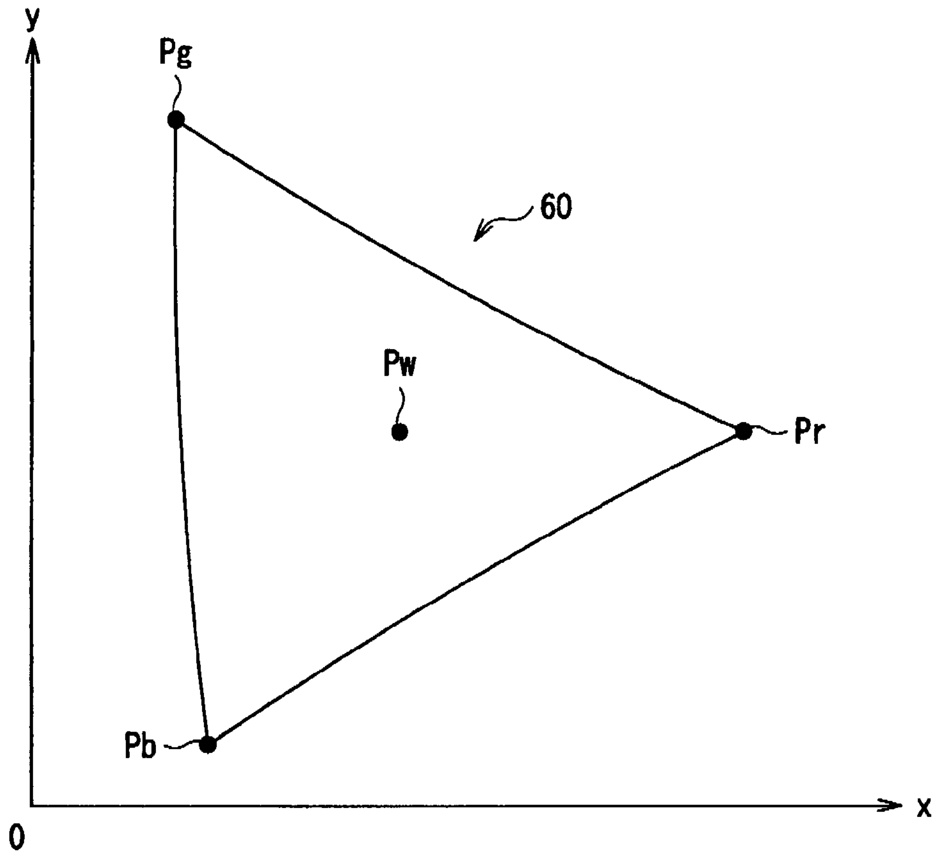

Referring to FIGS. 2, 3A and 3B, the sampling operation by the gate circuit 161 will be described in detail below. FIG. 2 shows timing operations of a sampling gate signal SG as a signal for performing a sampling over or during a predetermined gate period, and a red light receiving signal Sr, a green light receiving signal Sg and a blue light receiving signal Sb as light receiving signals supplied from the RGB photosensor 151 in a driving period T of the light source section 11, and FIG. 2(A) indicates the sampling gate signal SG, FIG. 2(B) indicates the red light receiving signal Sr, FIG. 2(C) indicates the green light receiving signal Sg and FIG. 2(D) indicates the blue light receiving signal Sb. Moreover, FIG. 3A shows a relationship between the drive currents Ir, Ig and Ib of the LEDs 11R, 11G and 11B and the light emission amounts B of the LEDs 11R, 11G and 11B, and FIG. 3B shows the chromaticity points Pr, Pg, Pb and Pw of the red light, the green light, the blue light and the white light on an xy chromaticity diagram. A symbol 60 in FIG. 3B indicates a color reproduction range defined by the chromaticity points Pr, Pg and Pb.

For example, as shown in FIG. 2, the gate circuit 161 performs a sampling on the red light receiving signal Sr, the green light receiving signal Sg and the blue light receiving signal Sb over or during a predetermined gate period τ (for example, between timings t0 and t1 or t3 and t4 in the drawing) in each driving period T. In other words, irrespective of the length (width) of the lighting periods ΔT of the LEDs 11R, 11G and 11B, only light receiving signals in the gate period τ are sampled and outputted, and they are integrated in the integrator circuit 163 in a subsequent stage to determine the intensity-dependent light emission amounts (corresponding to the magnitudes of the drive currents Ir, Ig and Ib in the drawing) which depend on the light emission intensities of the LEDs 11R, 11G and 11B by calculation.

Therefore, in the above-described CPU 181, on the basis of the intensity-dependent light emission amount of each color, for example, as shown in FIG. 3A, the drive currents Ir, Ig and Ib are controlled so that the light emission amounts B of the color lights match one another (in this case, the drive currents Ir, Ig and Ib are set to drive currents Ir1, Ig1 and Ib1, respectively), and the lighting periods ΔT of the LEDs 11R, 11G and 11B match one another, so, for example, as shown in FIG. 3B, the illumination light Lout from the light source section 11 is controlled so as to become white light (corresponding to the chromaticity point Pw in the drawing).

It is desirable that the above-described driving period T [s] is set by the control section 18 which will be described later so as to satisfy $(1/T) \geqq 20$ [kHz]. It is because when the driving period T is set so as to satisfy the formula, a drive frequency (1/T) is out of an audible range, so a sound resulting from the drive frequency is not audible. Moreover, it is desirable that a relationship between the driving period T and the gate period τ is set so as to satisfy $(\tau/T) < 0.5 (=1/2)$. It is because when the formula is satisfied, a sampling period occupying the driving period is relatively reduced, so as will be described later, the light emission amount range of the illumination light is expanded (the contrast is improved), compared to related arts.

Figure 4:
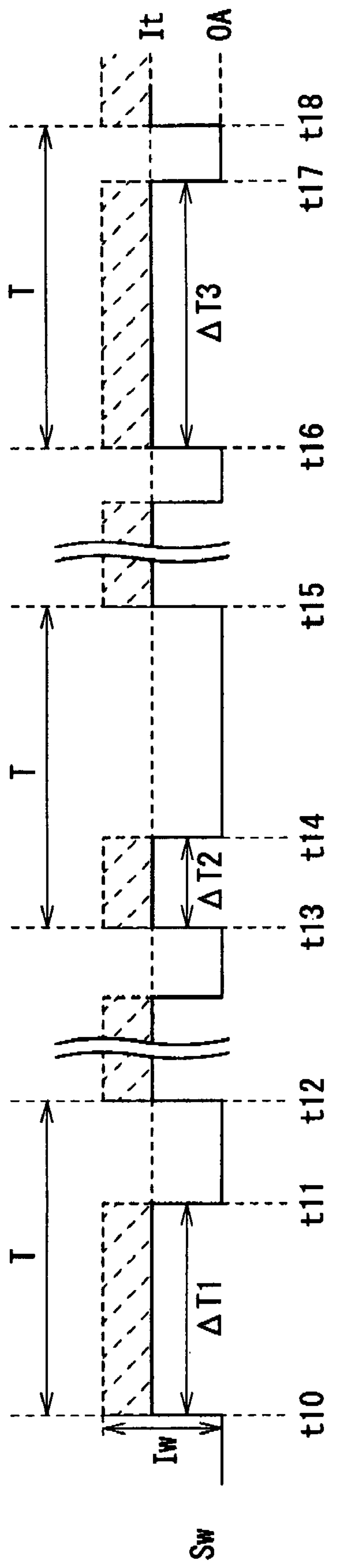
FIG. 4 is a timing chart for describing the operation of a period-dependent light emission amount detecting section.
Figure 20:
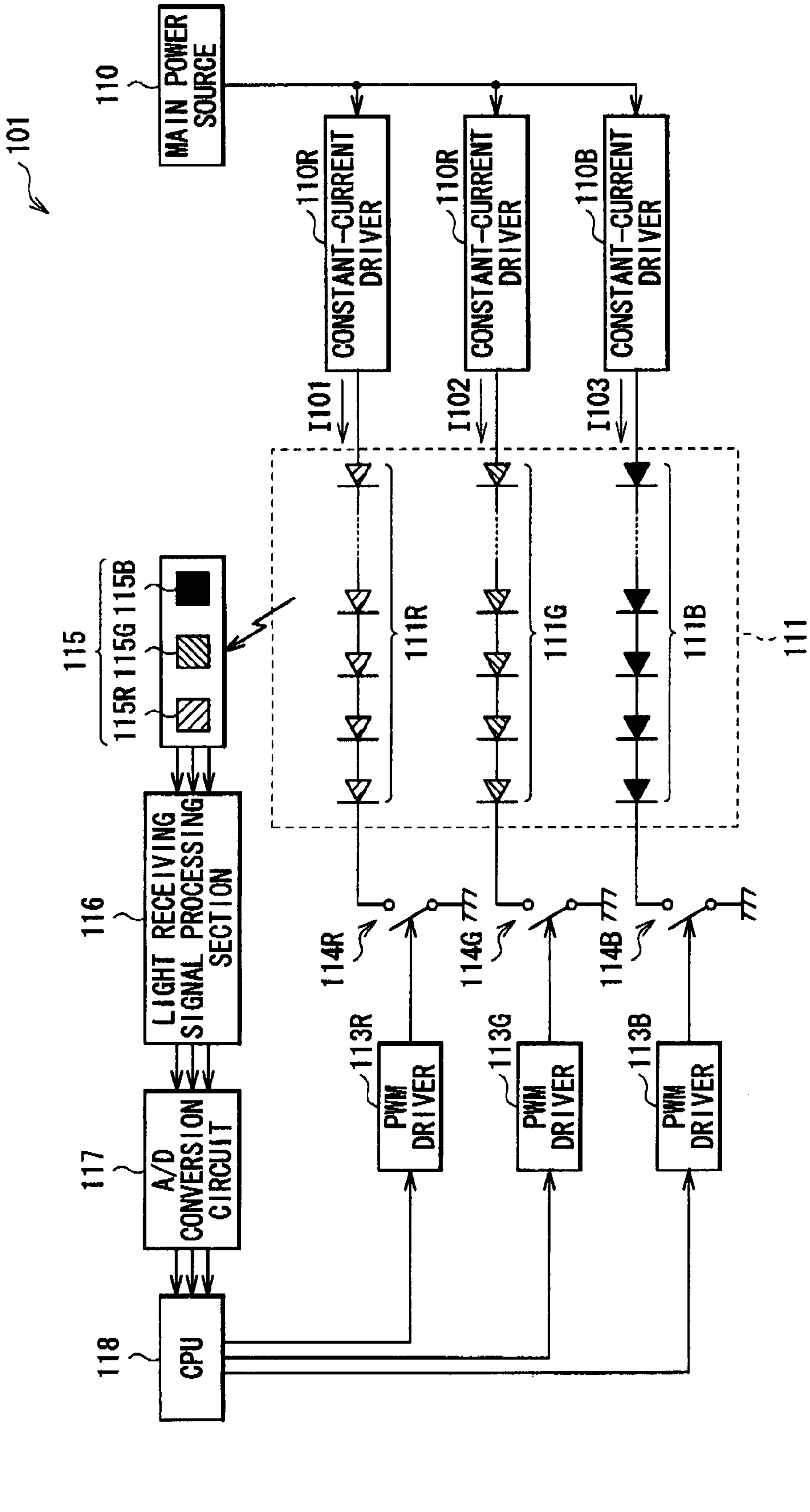
FIG. 20 RELATED ART
FIG. 20 is a circuit block diagram showing the whole structure of an illumination system using LEDs in a related art.

Next, referring to FIGS. 4 through 6, the limiter process by the limiter circuit 172 will be described below. FIG. 4 shows the timing operation of the white light receiving signal Sw as a light receiving signal supplied from the W photosensor 152 in three driving periods T. Moreover, FIG. 5 shows a relationship between the lighting periods ΔT and the light emission amounts B of the LEDs 11R, 11G and 11B in the illumination system 1 according to the embodiment, and FIG. 6 shows a relationship between the lighting period ΔT and the light emission amount B of each color LED in an illumination system in a related art, for example, as shown in FIG. 20.

For example, as shown in FIG. 4, the limiter circuit 172 limits the white light receiving signal Sw by a limit current It with a predetermined intensity which is set so as to be lower than the intensity Iw of the white light receiving signal Sw, and outputs the white light receiving signal Sw, and the white light receiving signal Sw is integrated in the integrator circuit 173 in a subsequent stage to determine the period-dependent light emission amounts (corresponding to the lengths of the lighting periods ΔT1, ΔT2 and ΔT3 in the drawing) which depend on the lighting periods ΔT of the LEDs 11R, 11G and 11B (which match one another as shown in FIG. 2 in the embodiment) by calculation.

Figure 5:
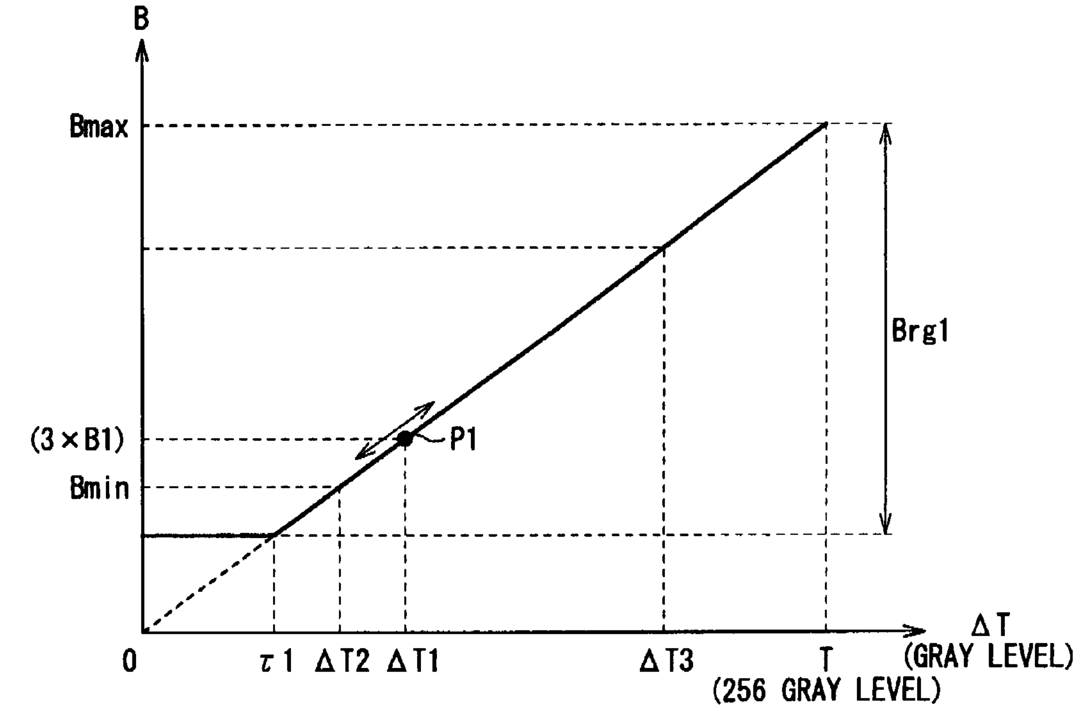
FIG. 5 is a plot for describing a process of controlling a light emission period by the control section according to the first embodiment.

Therefore, for example, as shown in FIG. 5, on the basis of the period-dependent light emission amount, in the above-described CPU 182, the lighting periods ΔT of the LEDs 11R, 11G and 11B are controlled so that the light emission amount B of the whole illumination light Lout becomes a desired amount (shown by the shift of a point P1 in the drawing). For example, in the lighting periods ΔT1, ΔT2 and ΔT3 shown in FIG. 4, the light emission amount B is as shown in FIG. 5, and the light emission amount B is linearly increased with an increase in the lighting period ΔT.

Figure 6:
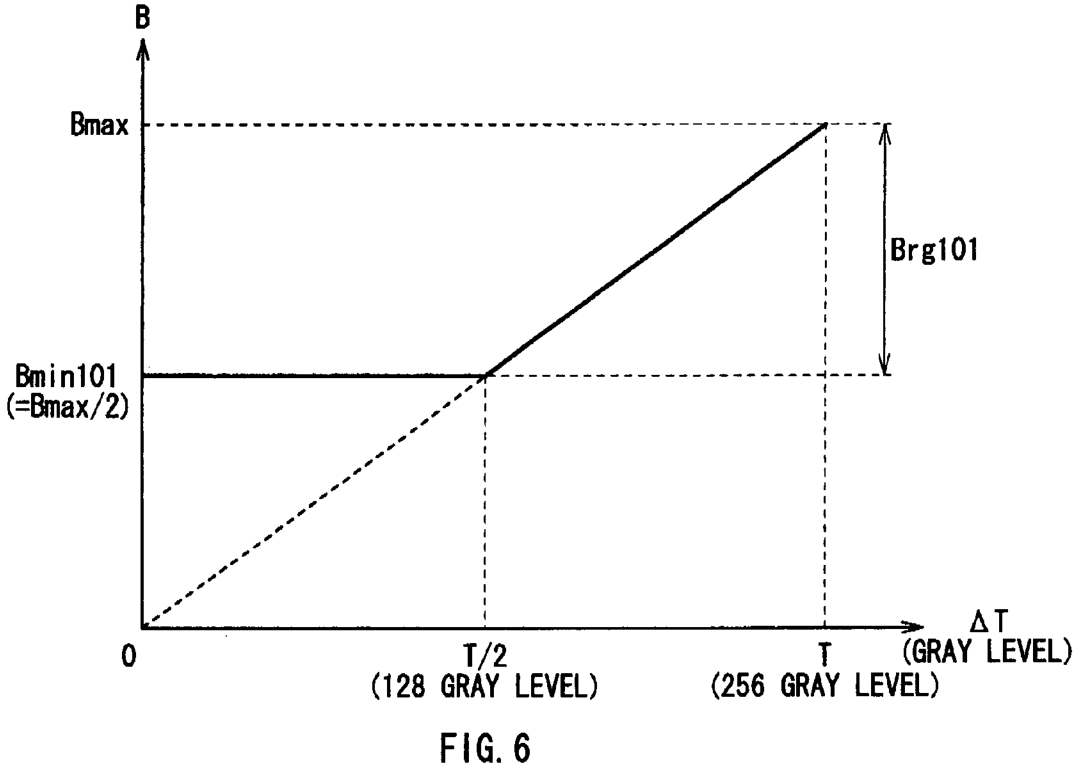
FIG. 6 is a plot showing a relationship between a light emission period and a light emission amount according to a comparative example.

Moreover, in the illumination system 1 according to the embodiment, the light receiving signals from the LEDs 11R, 11G and 11B are sampled concurrently as described above, and are set so that (τ/T)<0.5 is satisfied as described above, so the sampling period occupying the driving period is relatively reduced, and compared to a light emission amount range Brg101 of an illumination light in a comparative example shown in FIG. 6, a light emission amount range Brg1 of the illumination light Lout is expanded (the contrast is improved).

The CPUs 181 and 182 correspond to specific examples of "a control means" in the invention, and the CPU 181 corresponds to a specific example of "a light emission intensity varying means" in the invention, and the CPU 182 corresponds to a specific example of "a lighting period varying means" in the invention. The light receiving section 15, the intensity-dependent light emission amount detecting section 16 and the period-dependent light emission amount detecting section 17 correspond to specific examples of "a detection means" in the invention, and the intensity-dependent light emission amount detecting section 16 corresponds to a specific example of "a first detection means" in the invention, and the period-dependent light emission amount detecting section 17 corresponds to a specific example of "a second detection means" in the invention. The RGB photosensor 151 in the light receiving section 15 corresponds to a specific example of "a plurality of first light receiving elements" in the invention, and the W photosensor 152 corresponds to a specific example of "a second light receiving element" in the invention.

In the illumination system 1 according to the embodiment, the constant currents Ir, Ig and Ib flow from the constant current power source drivers 12R, 12G and 12B to the red LED 11R, the green LED 11G and the blue LED 11B, respectively, so a red light, a green light and a blue light are emitted, thereby the illumination light Lout as a mixed color light is emitted.

At this time, in the light receiving section 15, the light receiving signals Sr, Sg and Sb are received by the RGB photosensor 151, and are outputted to the intensity-dependent light emission amount detecting section 16, and the white light receiving signal Sw is received by the W photosensor 152, and is outputted to the period-dependent light emission amount detecting section 17.

In this case, in the intensity-dependent light emission amount detecting section 16, a predetermined signal process is performed on each of the light receiving signals Sr, Sg and Sb from the RGB photosensor 151, and the intensity-dependent light emission amount is detected. More specifically, in the gate circuit 161, for example, as shown in FIG. 2, the red light receiving signal Sr, the green light receiving signal Sg and the blue light receiving signal Sb are sampled in the gate period τ in each driving period T, and irrespective of the lengths (widths) of the lighting periods ΔT of the LEDs 11R, 11G and 11B, only the light receiving signals in the gate period τ are outputted. Next, the sampled light receiving signals are integrated in the integrator circuit 163, thereby the intensity-dependent light emission amount of each color is determined by calculation.

On the other hand, in the period-dependent light emission amount detecting section 17, a predetermined signal process is performed on the white light receiving signal Sw from the W photosensor 152 to detect the period-dependent light emission amount. More specifically, in the limiter circuit 172, for example, as shown in FIG. 4, the white light receiving signal Sw is limited by the limit current It with a predetermined intensity. Next, the limited white light receiving signal Sw is integrated in the integrator circuit 173, thereby on the basis of the lighting periods ΔT of the LEDs 11R, 11G and 11B, the period-dependent light emission amount is determined by calculation.

In the control section 18, for example, as shown in FIG. 3A, in the CPU 181, the drive currents Ir, Ig and Ib are controlled on the basis of the intensity-dependent light emission amount so that the light emission amounts B of red light, green light and blue light match one another, and the lighting periods ΔT of the LEDs 11R, 11G and 11B are set so as to match one another, and, for example, as shown in FIG. 3B, the constant-current drivers 12R, 12G and 12B are controlled so that the illumination light Lout from the light source section 11 becomes a white light (corresponding to the chromaticity point Pw in the drawing), and the values of the drive currents Ir, Ig and Ib, that is, the light emission intensities of the LEDs 11R, 11G and 11B are adjusted. Moreover, in the CPU 182, for example, as shown in FIG. 5, the PWM driver 13 is controlled on the basis of the period-dependent light emission amount so that the light emission intensity of the whole illumination light Lout becomes a desired light emission intensity while maintaining the color balance to be a white light, and the on periods of the switches 14R, 14G and 14B, that is, the lighting periods ΔT of the LEDs 11R, 11G and 11G are adjusted. Thus, in the illumination system 1 according to the embodiment, the light emission intensities and the lighting periods ΔT of the LEDs 11R, 11G and 11B are individually controlled, thereby the light emission amount of the whole illumination light Lout is controlled.

As described above, in the illumination system 1 according to the embodiment, the CPUs 181 and 182 in the control section 18 varies the light emission intensities and the lighting periods ΔT of the LEDs 11R, 11G and 11B so as to control the light emission amount of the whole illumination light Lout, so while maintaining the color balance of the illumination light Lout (i.e., maintaining a ratio of area of the hatched regions in FIGS. 2(B) to 2(D)), the light emission intensity can be varied.

More specifically, the gate circuit 161 performs a sampling on the red light receiving signal Sr, the green light receiving signal Sg and the blue light receiving signal Sb over or during the predetermined gate period τ, and the integrator circuit 163 integrates them, so irrespective of the lengths of the lighting periods ΔT of the LEDs 11R, 11G and 11B, only the light receiving signal in the gate period τ can be outputted, and the intensity-dependent light emission amount of each color can be determined. Moreover, the limiter circuit 172 limits the white light receiving signal Sw to the limit current It with a predetermined intensity or less, and the integrator circuit 173 integrates the white light receiving signal Sw, so irrespective of the light emission intensities of the LEDs 11R, 11G and 11B, the lighting periods ΔT of the LEDs 11R, 11G and 11B can be determined, and the period-dependent light emission amount can be determined by calculation.

Moreover, by control on the basis of the intensity-dependent light emission amount and the period-dependent light emission amount detected by the light receiving section 15, the intensity-dependent light emission amount detecting section 16 and the period-dependent light emission amount detecting section 17, the illumination lights Lout from the LEDs 11R, 11G and 11B can be controlled successively.

Further, the lighting periods ΔT of the LEDs 11R, 11G and 11B match one another, so the illumination light Lout can be prevented from being colored, and can be a white light.

<Structure of Liquid Crystal Display>

Figure 7:
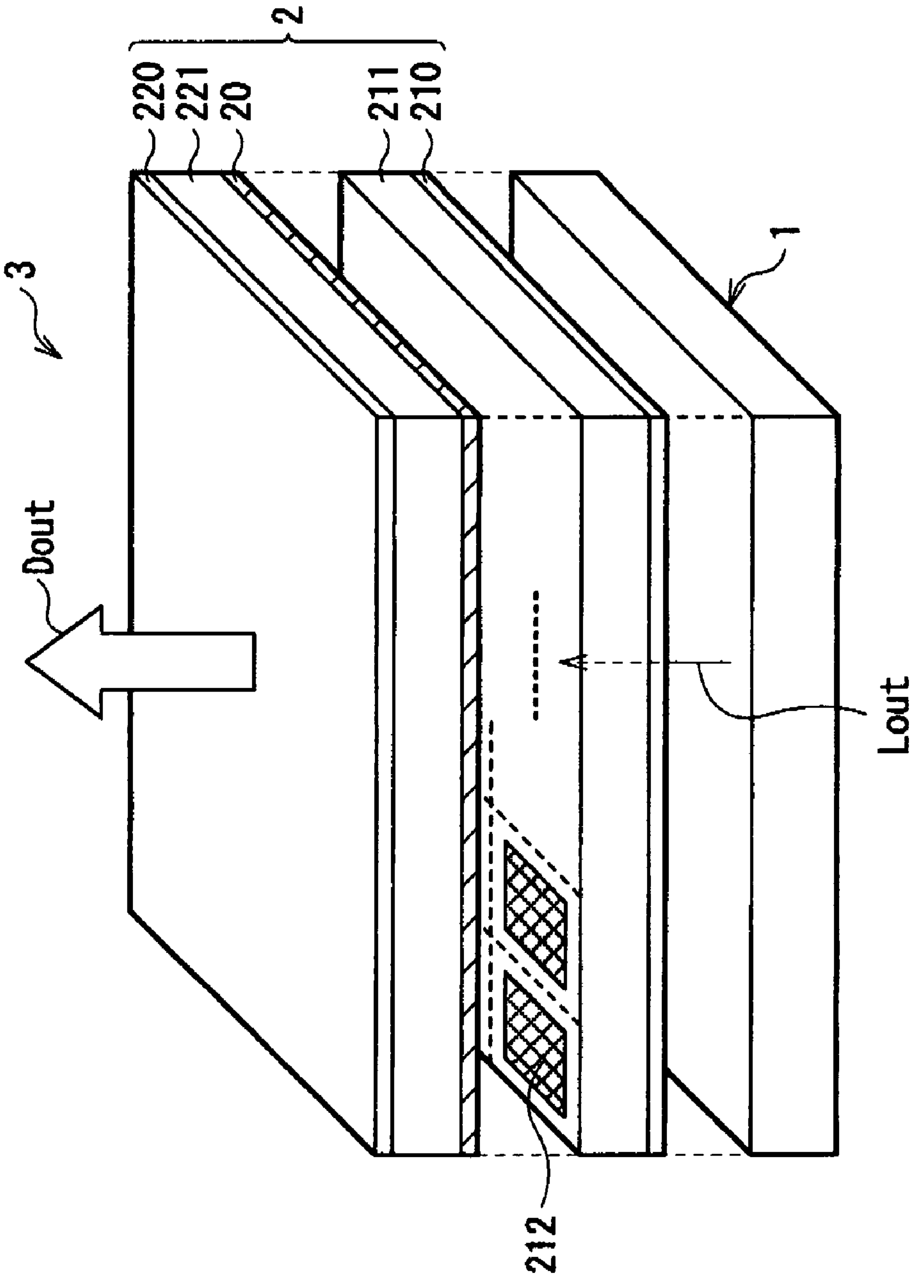
FIG. 7 is a perspective view showing the whole structure of a liquid crystal display according to the first embodiment.

Next, an example of a liquid crystal display using an illumination system with a structure shown in FIG. 1 will be described below. As shown in FIG. 7, a liquid crystal display (a liquid crystal display 3) using the illumination system as a backlight (an illumination means) for liquid crystal display will be described as an example.

The liquid crystal display 3 is a transmissive liquid crystal display using the illumination system 1 with the structure shown in FIG. 1 as a backlight, and includes the illumination system 1 and a transmissive liquid crystal display panel 2.

The liquid crystal display panel 2 includes a transmissive liquid crystal layer 20, a pair of substrates between which the liquid crystal layer 20 is sandwiched, that is, a TFT (This Film Transistor) substrate 211 as a substrate on a side closer to the illumination system 1 and a facing electrode substrate 221 facing the TFT substrate 211, and polarizing plates 210 and 220 laminated on a side of the TFT substrate 211 and a side of the facing electrode substrate 221 opposite to the sides where the liquid crystal layer 20 is arranged.

Moreover, the TFT substrate 211 includes pixels in a matrix form, and in each pixel, a pixel electrode 212 including a driving element such as a TFT is formed.

Figure 8:
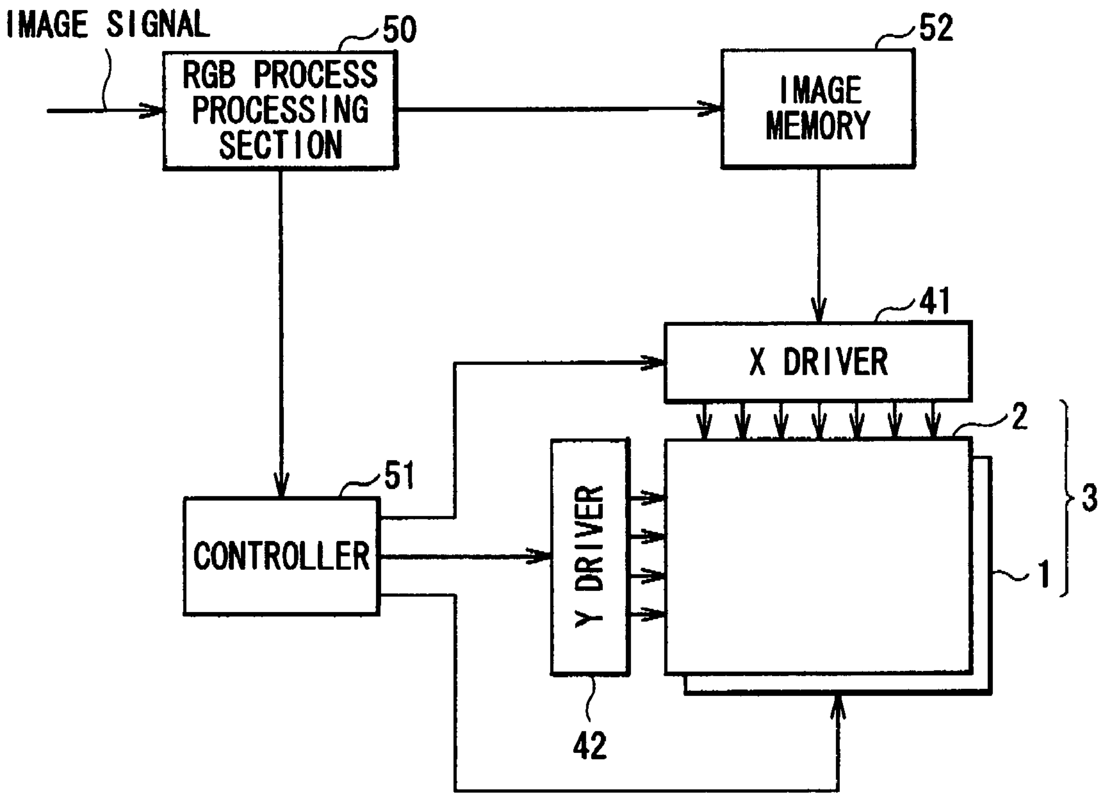
FIG. 8 is a circuit block diagram showing an example of a driving circuit of the liquid crystal display shown in FIG. 7.

FIG. 8 shows the structure of a driving circuit for displaying an image by driving the liquid crystal display 3. Such a driving circuit includes an X driver (data driver) 41 supplying a drive voltage on the basis of an image signal to each pixel electrode 212 in the liquid crystal display panel 2, a Y driver (gate driver) 42 driving the pixel electrodes 212 in the liquid crystal panel 2 along a scanning line (not shown) in order, a controller 51 controlling the X driver 41, the Y driver 42 and the control section 18 in the illumination system 1, a RGB process processing section 50 generating a RGB signal by processing an image signal from outside, and an image memory 52 as a frame memory storing the RGB signal from the RGB process processing section 50.

In the liquid crystal display 3, by the drive voltage outputted from the X driver 41 and the Y driver 42 to the pixel electrodes 212 on the basis of the image signal, the illumination light Lout from the illumination system 1 is modulated in the liquid crystal layer 20, and is outputted from the liquid crystal panel 2 as a display light Dout. Thus, the illumination system 1 functions as the backlight of the liquid crystal display 3, and an image is displayed by the display light Dout.

In this case, the liquid crystal display 3 according to the embodiment, as described above, the illumination system 1 functions as the backlight of the liquid crystal display 3, so also in the display light Dout emitted from the liquid crystal panel 2, as in the case of the illumination light Lout, while maintaining the color balance, the light emission intensity can be varied.

As described above, in the liquid crystal display according to the embodiment, the illumination system 1 is used as the backlight of the liquid crystal display 3, so in the display light Dout emitted from the liquid crystal panel 2, as in the case of the illumination light Lout, while maintaining the color balance, the light emission intensity can be varied, thereby the quality of a displayed image can be improved.

Second Embodiment

Next, a second embodiment of the invention will be described below. In an illumination system according to the embodiment, the illumination area of a light source section is divided into a plurality of partial light sources. In the embodiment, like components are denoted by like numerals as of the first embodiment and will not be further described.

Figure 9:
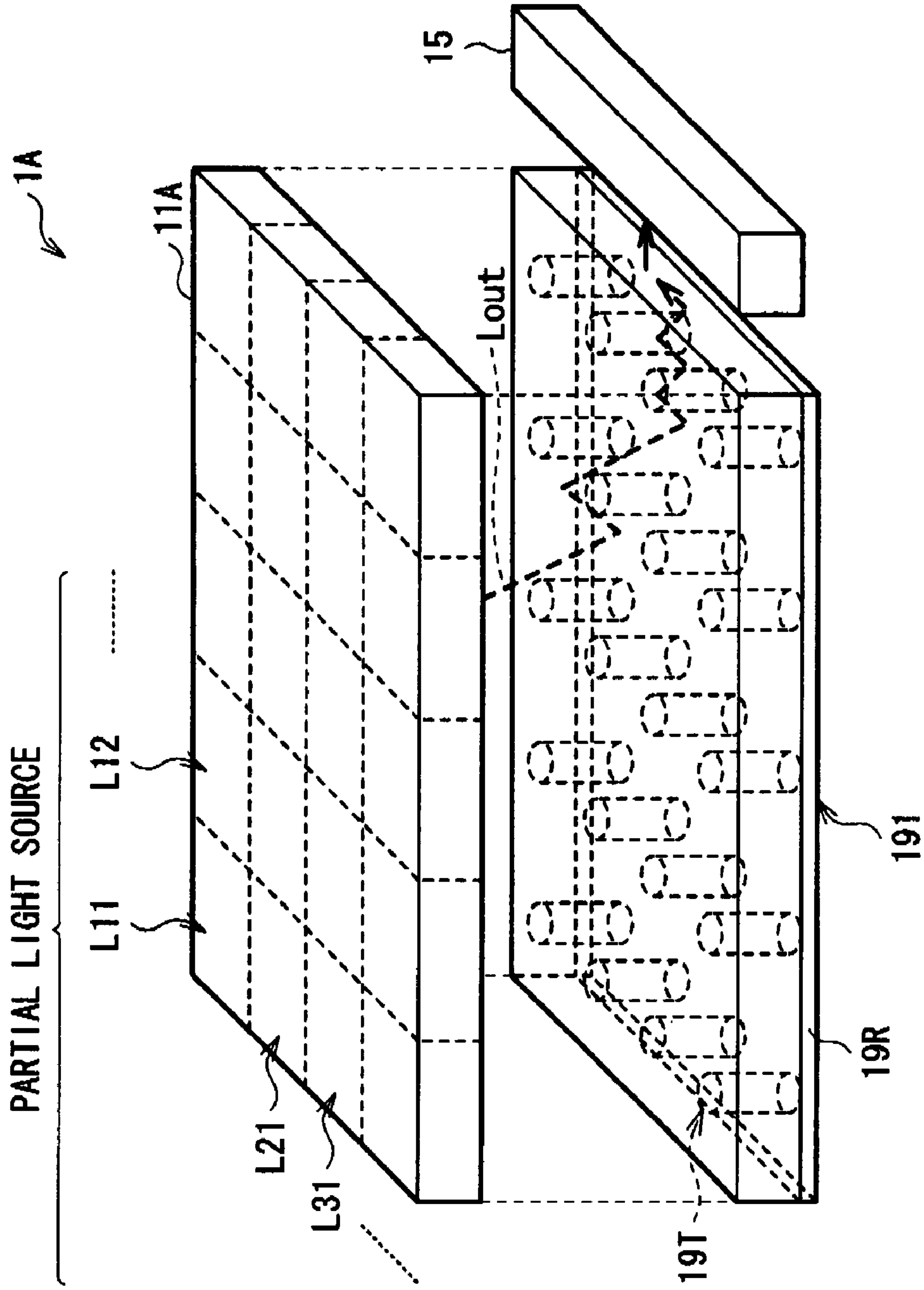
FIG. 9 is a perspective view of the structure of a main part of an illumination system according to a second embodiment of the invention.

FIG. 9 shows a perspective view of the structure of a main part of the illumination system (an illumination system 1A) according to the embodiment. The illumination system 1A includes a light source section 11A including a plurality of partial light sources L11, L12, . . . , L21, . . . , L31, . . . arranged in a matrix form as examples of partial illumination areas, a light guide plate 191 guiding a part of the illumination light Lout from the light source 11A to the light receiving section 15 as an example of a light guide means, and a driving circuit (not shown) driving the partial light sources in order as an example of the drive means. The structures of other components included in the illumination system 1 shown in FIG. 1 (the constant-current drivers 12R, 12G and 12B, the PWM driver 13, the switch section 14, the intensity-dependent light emission amount detecting section 16, the period-dependent light emission amount detecting section 17 and the control section 18) are the same, so they are not shown in the drawing.

Figure 10:
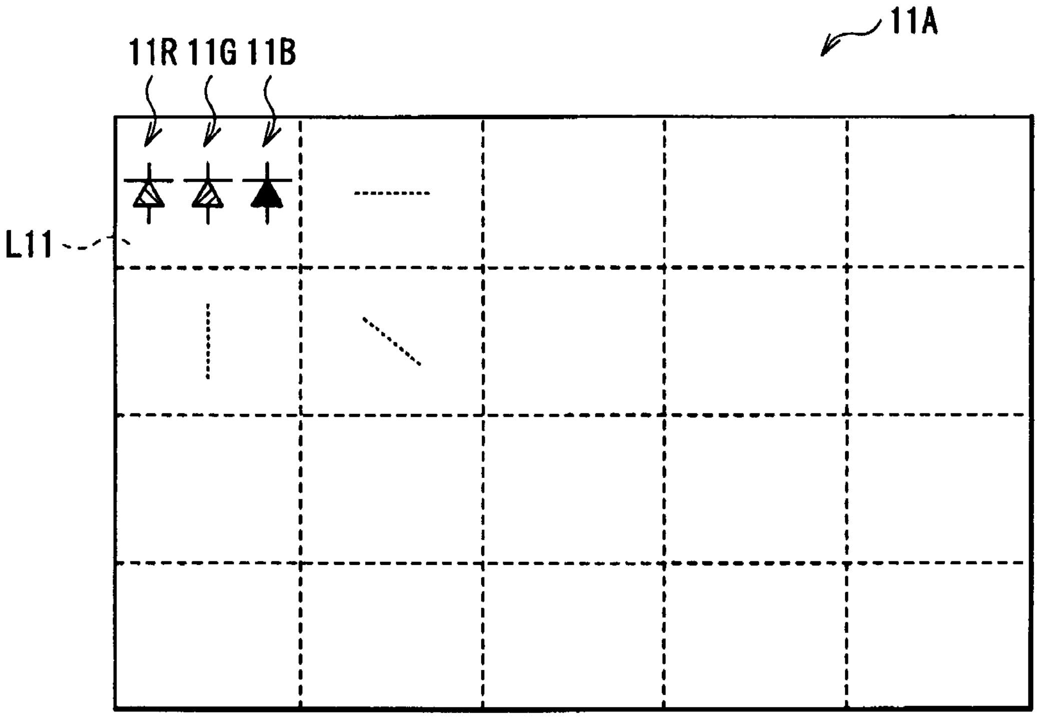
FIG. 10 is a schematic view for describing a structural example of partial light sources shown in FIG. 9.

The partial light sources L11, . . . are light sources formed by dividing the illumination area of the light source section 11A into a plurality of areas, and, for example, as shown in FIG. 10, the partial light sources L11, . . . each include the LEDs 11R, 11G and 11B, and can be individually controlled.

In the light guide plate 191, a light guide path 19R is formed uniformly on its plane, and a columnar light guide projection 19T is formed corresponding to each partial light source. As shown in the drawing, the light guide projection 19T disturbs the total reflection of the illumination light Lout at this part so as to obtain the illumination light Lout. The position of the light guide projection 19T is not limited to this, and as long as a part of the illumination light Lout can be guided to the light receiving section 15, the light guide projection 19T may be arranged in any position.

Figure 11A:
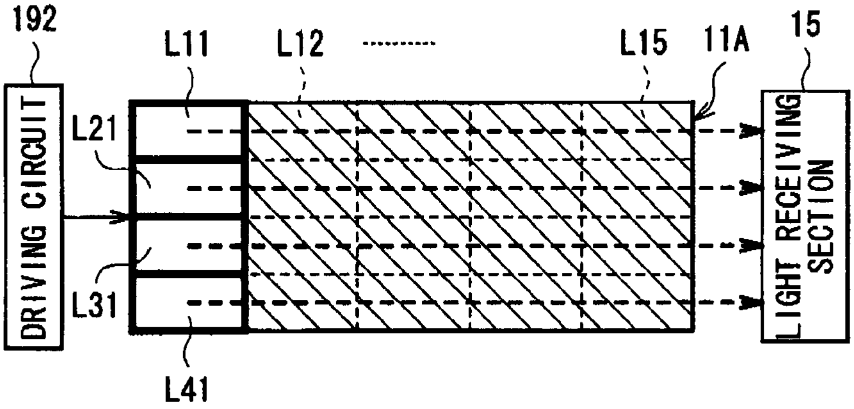
FIGS. 11A, 11B and 11C are schematic views for describing an example of the sequential lighting operation of the partial light sources.
Figure 11B:
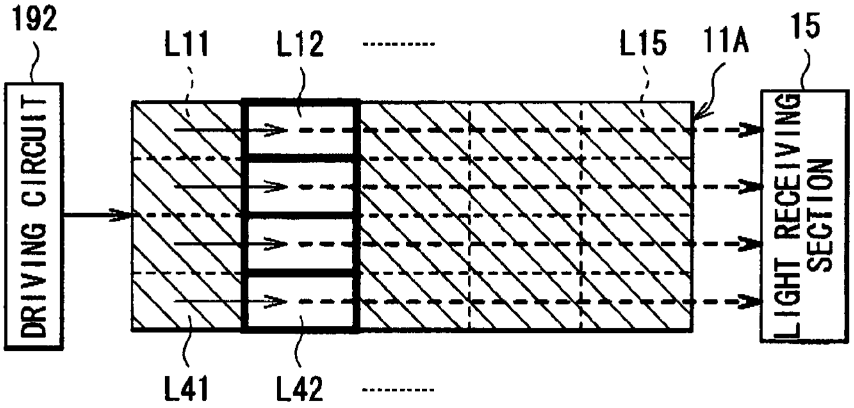
Figure 11C:
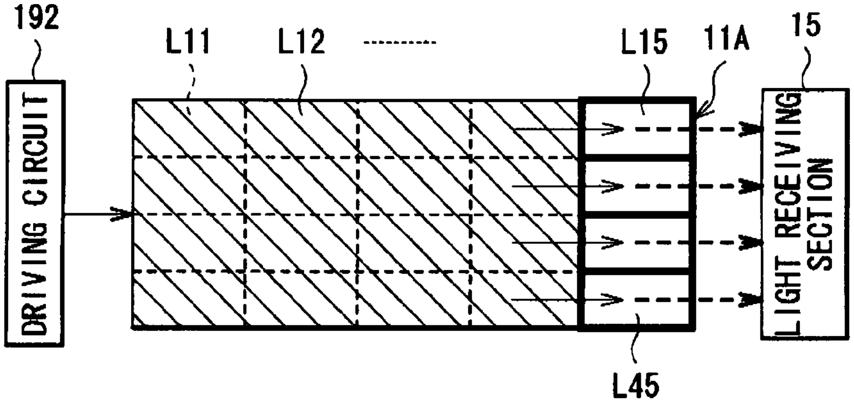

Moreover, FIGS. 11A, 11B and 11C schematically show the sequential lighting operation of the partial light sources L11, . . . by the driving circuit 192.

The light guide path is separated into lines in a horizontal direction in such a manner, and by the driving circuit 192, the partial light sources in the lines optically individually light up and out in parallel in order, and the illumination lights Lout in the partial light sources are guided to the light receiving section 15 in order.

Figure 12A:
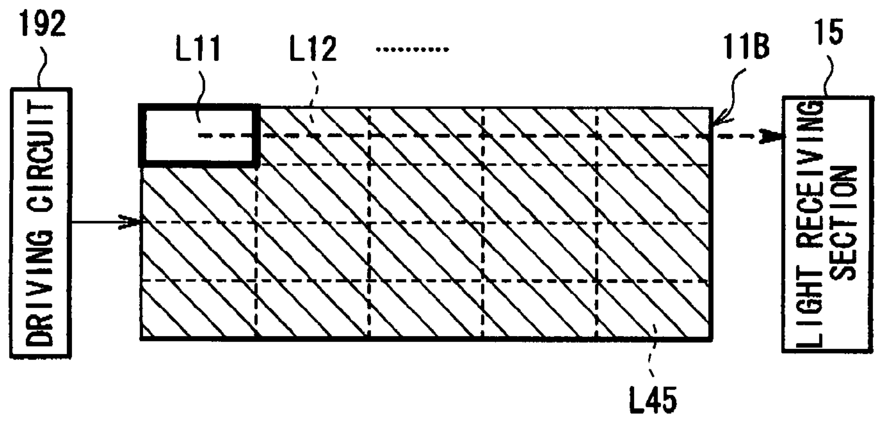
FIGS. 12A, 12B and 12C are schematic views for describing another example of the sequential lighting operation of the partial light sources.
Figure 12B:
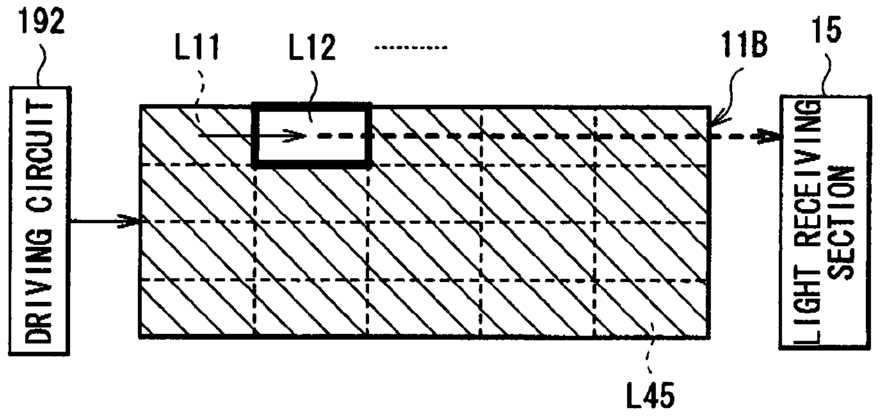
Figure 12C:
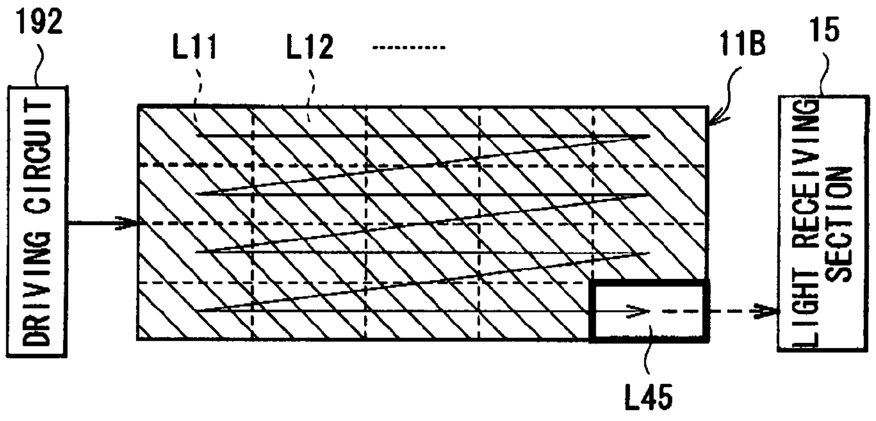

For example, as shown in the light source section 11B in FIGS. 12A, 12B and 12C, by the driving circuit 192, the partial light sources may light up and out one by one in order, and the illumination lights Lout in the partial light sources may be guided to the light receiving section in order. In such a structure, the partial light sources do not light up and out in parallel, so it is not necessary to separate the light guide path, and the number of photosensors in the light receiving section 15 can be reduced (to one).

As described above, in the illumination system according to the embodiment, the illumination area of the light source section 11A is divided into a plurality of areas so as to form the partial light sources, so the color balance and the light emission intensity of the illumination light Lout in each partial light source can be individually controlled, and can be locally controlled.

As described above, the present invention is described referring to the first embodiment and the second embodiment; however, the invention is not limited to them, and can be variously modified.

Figure 13:
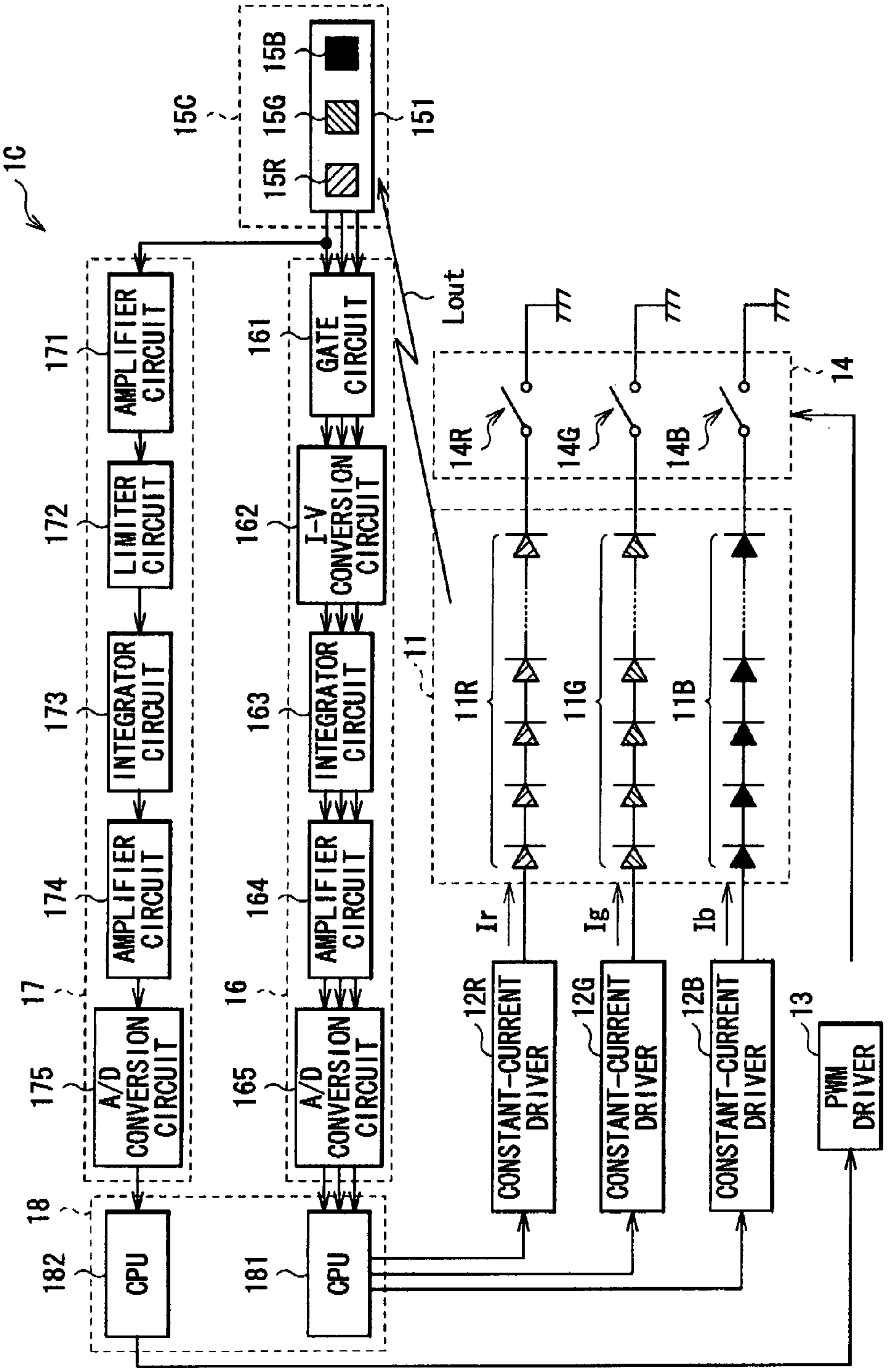
FIG. 13 is a circuit block diagram showing the whole structure of an illumination system according to a modification of the invention.

For example, in the above-described embodiments, the case where the light receiving section 15 includes the RGB photosensor 151 and the W photosensor 152 is described; however, for example, as shown in an illumination system 1C in FIG. 13, a light receiving section 15C including only the RGB photosensor 151 may be used. In such a structure, the circuitry can be simplified, and the cost of the system can be reduced. In this case, in the period-dependent light emission amount detecting section 17, at least one of the light receiving signals of colors may be used; however, as a change in temperature is small, a light receiving signal from the blue light receiving section 15B is preferably used.

Figure 14:
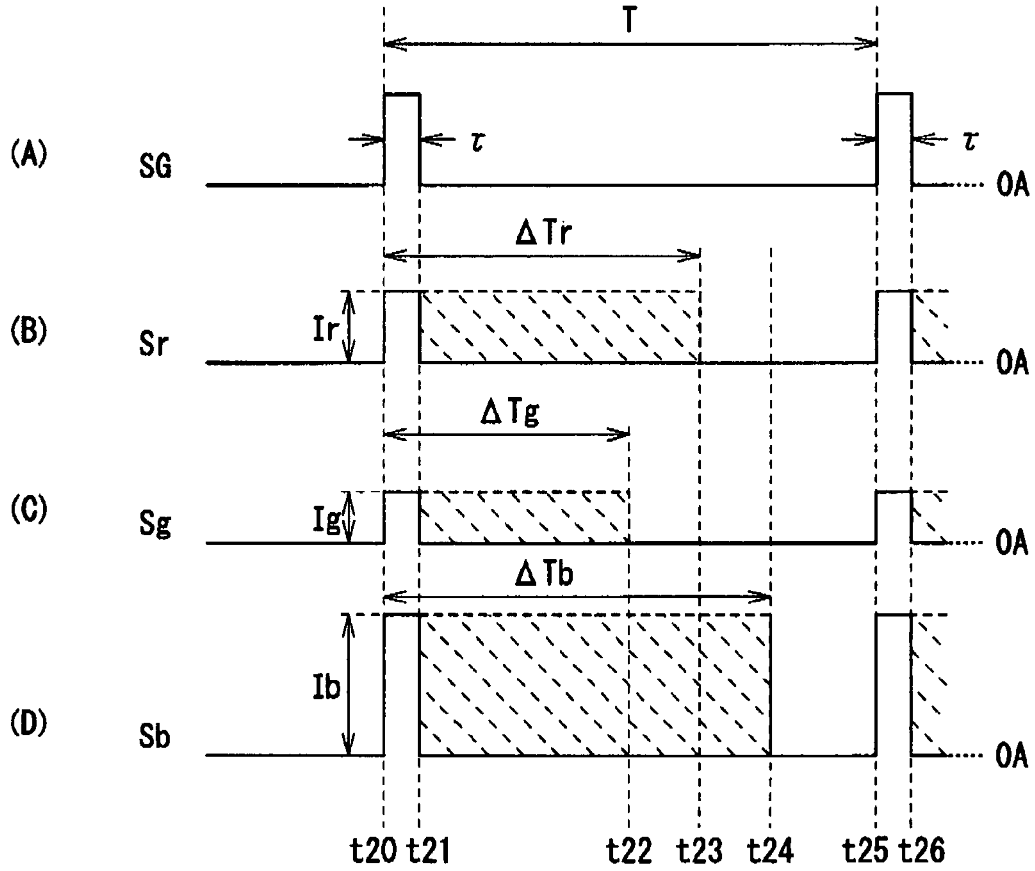
FIG. 14 is a plot for describing a process of controlling a light emission period according to the modification of the invention.
Figure 15:
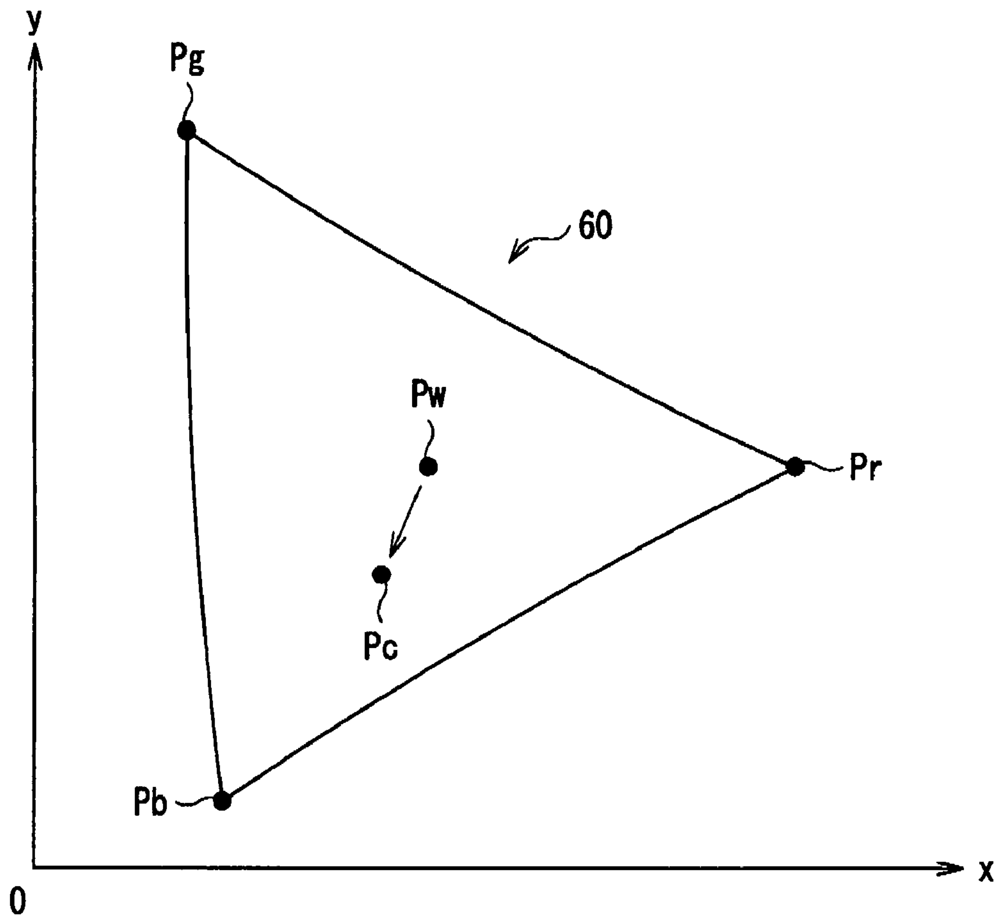
FIG. 15 is a plot for describing a reference chromaticity point in the controlling process shown in FIG. 14.

Moreover, in the above-described embodiments, the case where the lighting periods ΔT of the LEDs 11R, 11G and 11B match one another is described; however, for example, as shown in a timing chart in FIG. 14, the lighting periods of the LEDs 11R, 11G and 11B may be different from one another as in the case of ΔTr, ΔTg and ΔTb. In such a structure, for example, as shown in an xy chromaticity diagram in FIG. 15, the chromaticity point of the illumination light Lout can be shifted to illuminate a color light, and while maintaining an arbitrary color balance (i.e., chromaticity point Pc), the light emission intensity can be varied.

Figure 16:
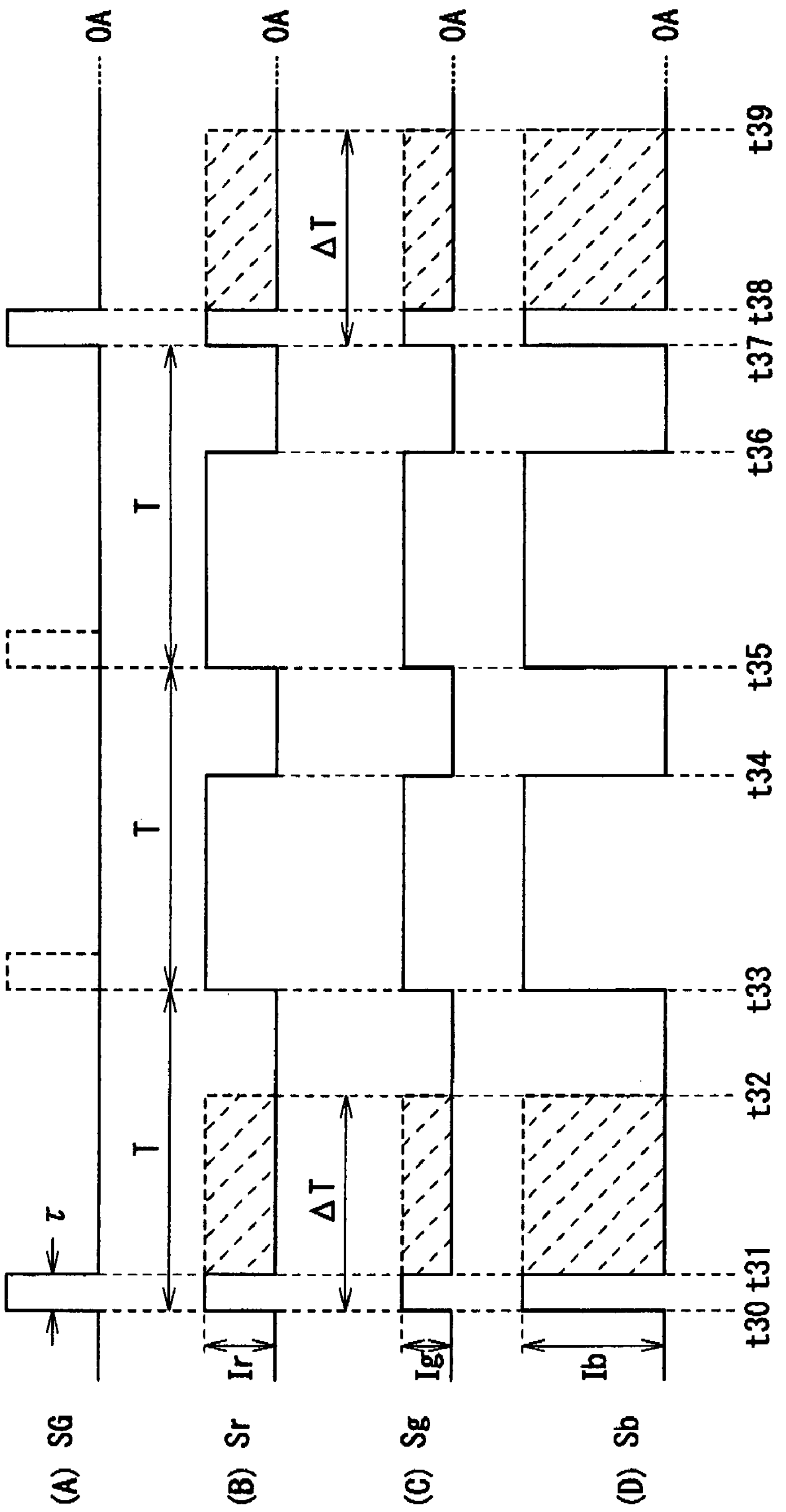
FIG. 16 is a timing chart for describing the operation of an intensity-dependent light emission amount detecting section according to a modification of the invention.
Figure 17:
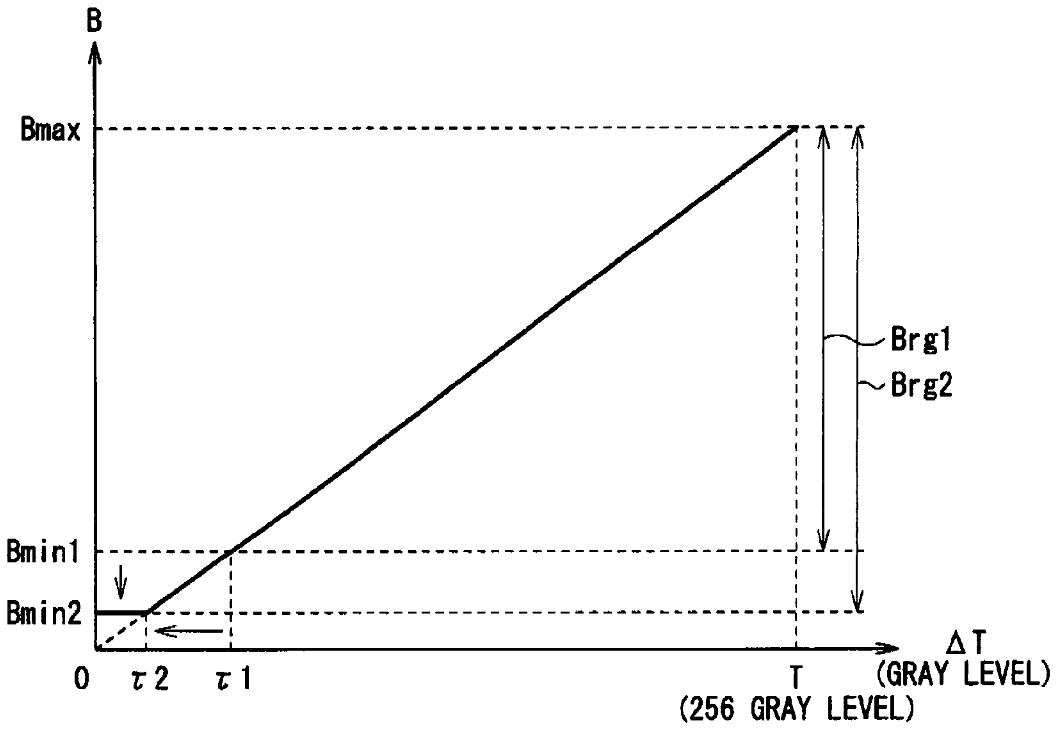
FIG. 17 is a plot for describing an effect by the controlling process shown in FIG. 16.

Further, in the above-described embodiments, the case where the gate period τ is set in each driving period T is described; however, for example, as shown in FIG. 16, the gate period τ may be set to skip some driving periods T. In such a structure, the sampling period occupying the driving period T can be further reduced relatively, and as shown in a light emission amount range Brg2 in FIG. 17, the light emission amount range of the illumination light Lout can be further expanded (the contrast can be further improved).

Figure 18:
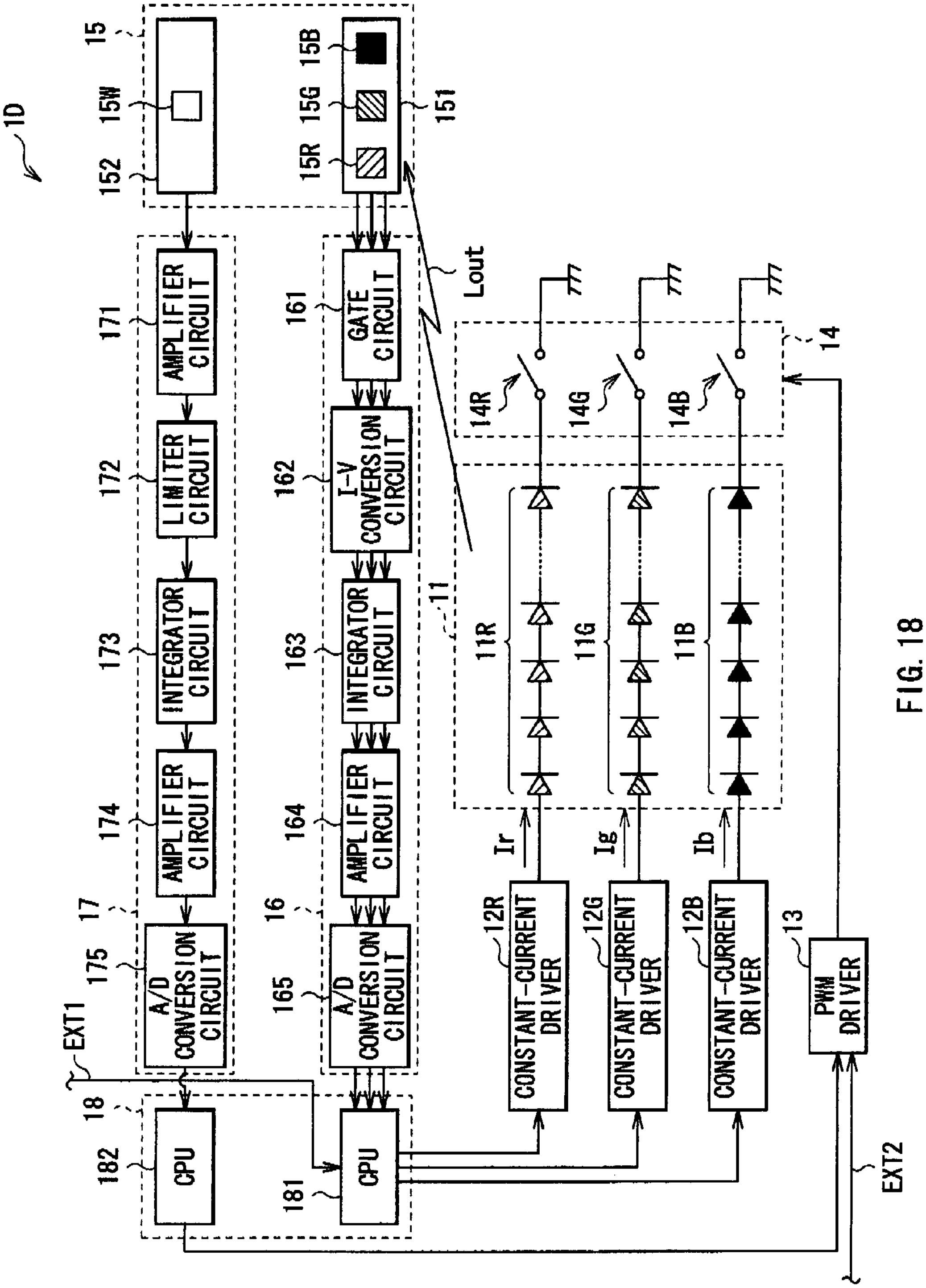
FIG. 18 is a circuit block diagram showing the whole structure of an illumination system according to a modification of the invention.

Moreover, in the above-described embodiments, the case where the light emission amount of the light source section 11 is controlled only by the intensity-dependent light emission amount and the period-dependent light emission amount on the basis of the light receiving signals from the light receiving section is described; however, for example, as shown in external signals EXT1 and EXT2 in FIG. 18, the light emission amount may be controlled through the use of an image signal inputted from outside or a control signal on the basis of an image signal in addition to the intensity-dependent light emission amount and the period-dependent light emission amount. More specifically, for example, the external signal EXT1 as a control setting value may be inputted from outside to the CPU 181 to control the constant-current drivers 12R, 12G and 12B, and the external signal EXT2 as an intensity modulation value may be directly inputted from outside to the PWM driver 13 to control the switch section 14.

Figure 19:
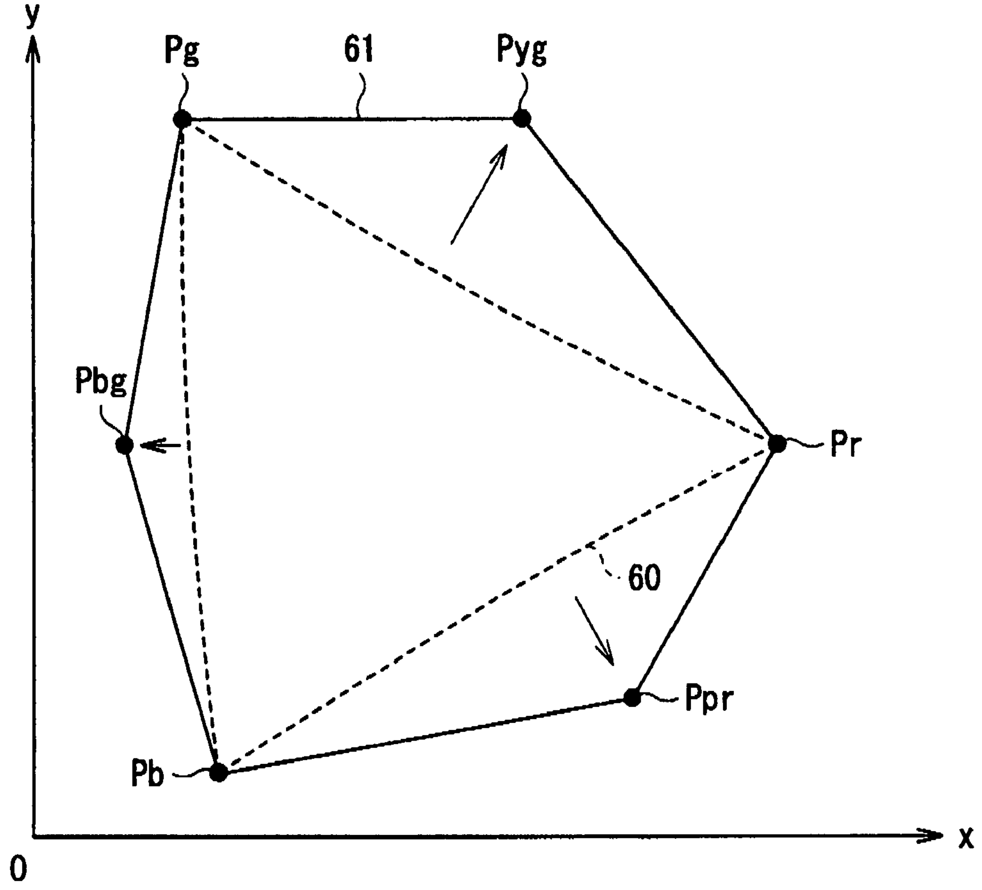
FIG. 19 is a plot for describing a color reproduction range according to a modification of the invention.

Further, in the above-described embodiments, the case where the light source section 11 includes the red LED 11R, the green LED11G and the blue LED11B is described; however, the light source section 11 may include another color LED in addition to them. In such a structure, for example, as shown in a color reproduction range 61 in FIG. 19, the color reproduction range can be expanded, and more various colors can be displayed.

In the above-described embodiments, the case where the LED is used as a light source is described; however, for example, the light source section may include an element such as an EL (ElectroLuminescence) element or a CCFL except for the LED.

It should be understood by those skilled in the art that various modifications, combinations, sub-combinations and alterations may occur depending on design requirements and other factors insofar as they are within the scope of the appended claims or the equivalents thereof.

The invention claimed is:

1. An illumination system, comprising:

a plurality of light sources each emitting a different color light;

lighting period varying means for varying the lighting period of each light source;

light emission intensity varying means for varying the light emission intensity of each light source;

control means for controlling the lighting period varying means and the light emission intensity varying means to control the light emission amount of each light source to obtain a specific color light by mixing the different color lights, wherein the control means controls a driving period T[s] of the light source such that the relation $(1/T) \geqq 20$ kHz is satisfied and thereby a drive frequency (1/T) is not an audible frequency; and detection means for detecting the light emission amount of each light source, the detection means including:

a plurality of first light receiving elements each extracting and receiving each color component from a mixed color light produced by mixing color lights from the light sources, and first detection means for concurrently performing, during a predetermined gate period τ, sampling on a light receiving signal from each of the first light receiving elements, wherein the control means controls the gate period τ during which the sampling on the light receiving signal from the first light receiving elements is performed and a driving period T of the light source such that a ratio of the two periods satisfies the relation $(\tau/T) < 0.5$.

2. The illumination system according to claim 1, wherein the control means controls the lighting period varying means and the light emission intensity varying means based on a detection result of the detection means.

3. The illumination system according to claim 2, wherein the detection means includes:

a second light receiving element receiving the mixed color light as it is;

the first detection means detecting, based on a result of the sampling, an intensity-dependent light emission amount which depends on a light emission intensity of the corresponding light source; and second detection means for detecting, based on a light receiving signal from the second light receiving element, a period-dependent light emission amount which depends on lighting periods of the light sources.

4. The illumination system according to claim 3, wherein the first detection means determines the intensity-dependent light emission amount by integrating the light receiving signal from the corresponding first light receiving element over or during the gate period.

5. The illumination system according to claim 3, wherein the second detection means determines the period-dependent light emission amount by limiting a level of the light receiving signal from the second light receiving element and then integrating the limited light receiving signal.

6. The illumination system according to claim 3, wherein the control means controls the first detection means so that the sampling is performed every two or more driving periods.

7. The illumination system according to claim 2, wherein the detection means includes:

a plurality of first light receiving elements each extracting and receiving each color component from a mixed color light produced by mixing color lights from the light sources;

a first detection means for concurrently performing a sampling on a light receiving signal from each of the first light receiving elements over or during a predetermined gate period, and detecting, on the basis of a result of the sampling, an intensity-dependent light emission amount which depends on a light emission intensity of the corresponding light sources; and a second detection means for detecting, based on at least one of a plurality of light receiving signals from the first light receiving elements, a period-dependent light emission amount which depends on lighting periods of the light sources.

8. The illumination system according to claim 2, wherein an illumination area emitting the specific color light includes a plurality of partial illumination areas each having the plurality of light sources and being capable of being individually controlled, and the illumination system further comprises:

a drive means for driving the plurality of light sources to light up in order on the partial illumination area basis; and a light guide means for guiding a mixed light produced by mixing color lights from the light sources to the detection means according to the sequential lighting operation of the partial illumination areas, wherein the lighting period varying means and the light emission intensity varying means vary the lighting period and the light emission intensity of each light source in each partial illumination area, respectively.

9. The illumination system according to claim 1, wherein the control means controls the lighting period varying means so that the lighting periods of the light sources match one another.

10. The illumination system according to claim 1, wherein the control means controls the lighting period varying means so that the lighting periods of the light sources are different from one another.

11. The illumination system according to claim 1, wherein the illumination system is an illumination system applied to a liquid crystal panel modulating incident light on the basis of an image signal, and the illumination system is used as a backlight for liquid crystal display, the backlight emitting light as the incident light from each light source to the liquid crystal panel, the light emission amount of each light source being controlled by the control means.

12. A liquid crystal display, comprising:

additive process illumination means for emitting a specific color light produced by mixing a plurality of color lights; and a liquid crystal panel modulating light emitted from the illumination means on the basis of an image signal, the illumination means including:

a plurality of light sources each emitting a different color light, lighting period varying means for varying the lighting period of each light source, light emission intensity varying means for varying the light emission intensity of each light source, control means for controlling the lighting period varying means and the light emission intensity varying means to control the light emission amount of each light source, wherein the control means controls a driving period T[s] of the light source such that the relation $(1/T) \geqq 20$ kHz is satisfied and thereby a drive frequency (1/T) is not an audible frequency, and detection means for detecting the light emission amount of each light source, the detection means including:

a plurality of first light receiving elements each extracting and receiving each color component from a mixed color light produced by mixing color lights from the light sources, and first detection means for concurrently performing, during a predetermined gate period $\tau$, sampling on a light receiving signal from each of the first light receiving elements, wherein the control means controls the gate period $\tau$ during which the sampling on the light receiving signal from the first light receiving elements is performed and a driving period T of the light source such that a ratio of the two periods satisfies the relation $(\tau/T) < 0.5$.

13. An illumination system, comprising:

a plurality of light sources each emitting a different color light;

a lighting period varying section varying the lighting period of each light source;

a light emission intensity varying section varying the light emission intensity of each light source;

a control section controlling the lighting period varying section and the light emission intensity varying section to control the light emission amount of each light source, to obtain a specific color light by mixing the different color lights, wherein the control section controls a driving period T[s] of the light source such that the relation $(1/T) \geqq 20$ kHz is satisfied and thereby a drive frequency (1/T) is not an audible frequency; and a detection section for detecting the light emission amount of each light source, the detection section including:

a plurality of first light receiving elements each extracting and receiving each color component from a mixed color light produced by mixing color lights from the light sources, and a first detection section for concurrently performing, during a predetermined gate period $\tau$, sampling on a light receiving signal from each of the first light receiving elements, wherein the control section controls the gate period $\tau$ during which the sampling on the light receiving signal from the first light receiving elements is performed and a driving period T of the light source such that a ratio of the two periods satisfies the relation $(\tau/T) < 0.5$.

14. A liquid crystal display, comprising:

an additive process illumination section emitting a specific color light produced by mixing a plurality of color lights; and a liquid crystal panel modulating light emitted from the illumination section on the basis of an image signal, the illumination section including:

a plurality of light sources each emitting a different color light, a lighting period varying section varying the lighting period of each light source, a light emission intensity varying section varying the light emission intensity of each light source, a control section controlling the lighting period varying section and the light emission intensity varying section to control the light emission amount of each light source, wherein the control section controls a driving period T[s] of the light source such that the relation $(1/T) \geqq 20$ kHz is satisfied and thereby a drive frequency (1/T) is not an audible frequency, and a detection section for detecting the light emission amount of each light source, the detection section including:

a plurality of first light receiving elements each extracting and receiving each color component from a mixed color light produced by mixing color lights from the light sources, and a first detection section for concurrently performing, during a predetermined gate period τ, sampling on a light receiving signal from each of the first light receiving elements, wherein the control section controls the gate period τ during which the sampling on the light receiving signal from the first light receiving elements is performed and a driving period T of the light source such that a ratio of the two periods satisfies the relation $(\tau/T)<0.5$.

* * * * *